Aug. 3, 1937.   R. W. BABSON   2,088,683
PARKING REGISTER
Original Filed Feb. 13, 1932   5 Sheets-Sheet 1

Inventor
Roger W. Babson
by Wright, Brown, Quinby & May
attys.

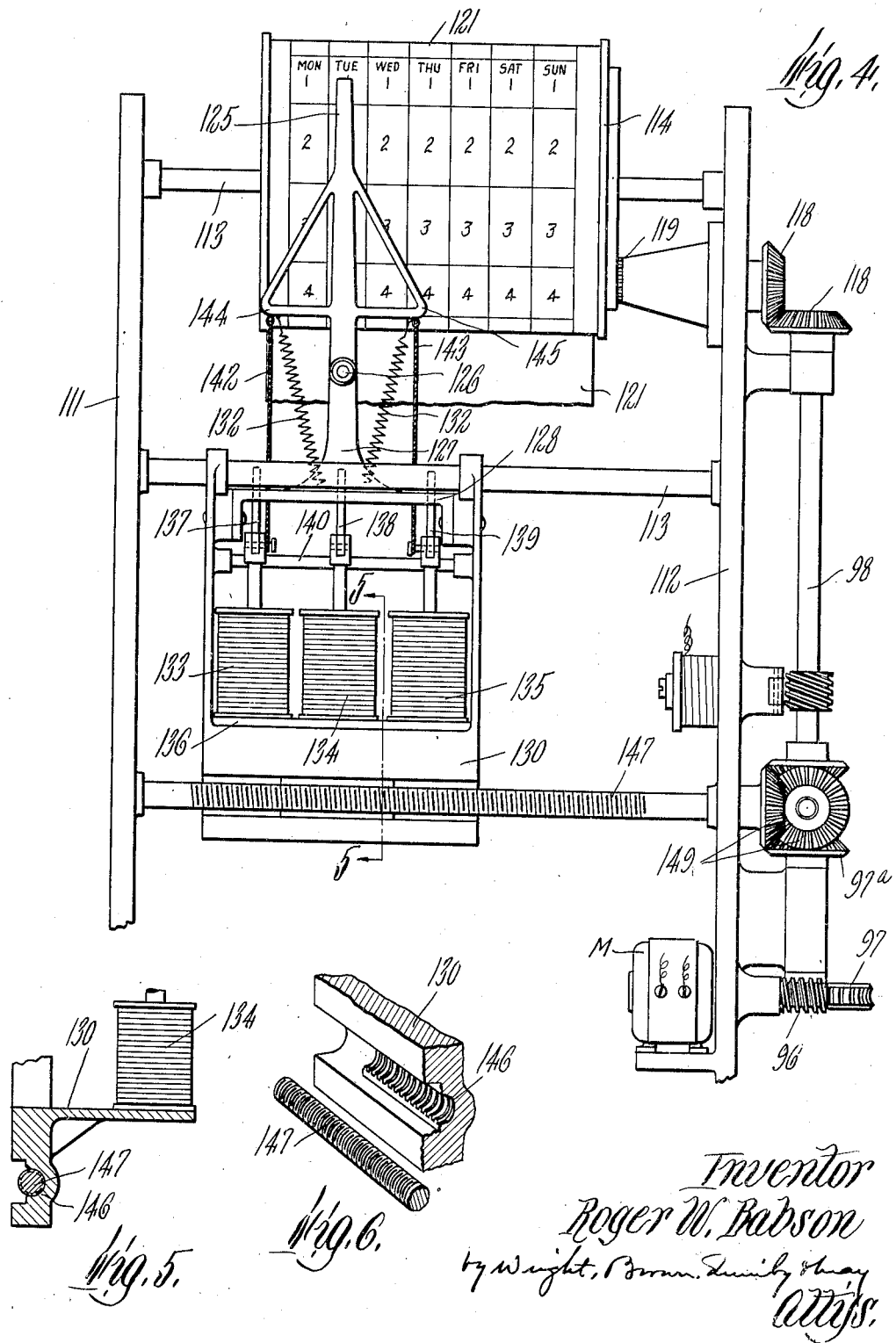

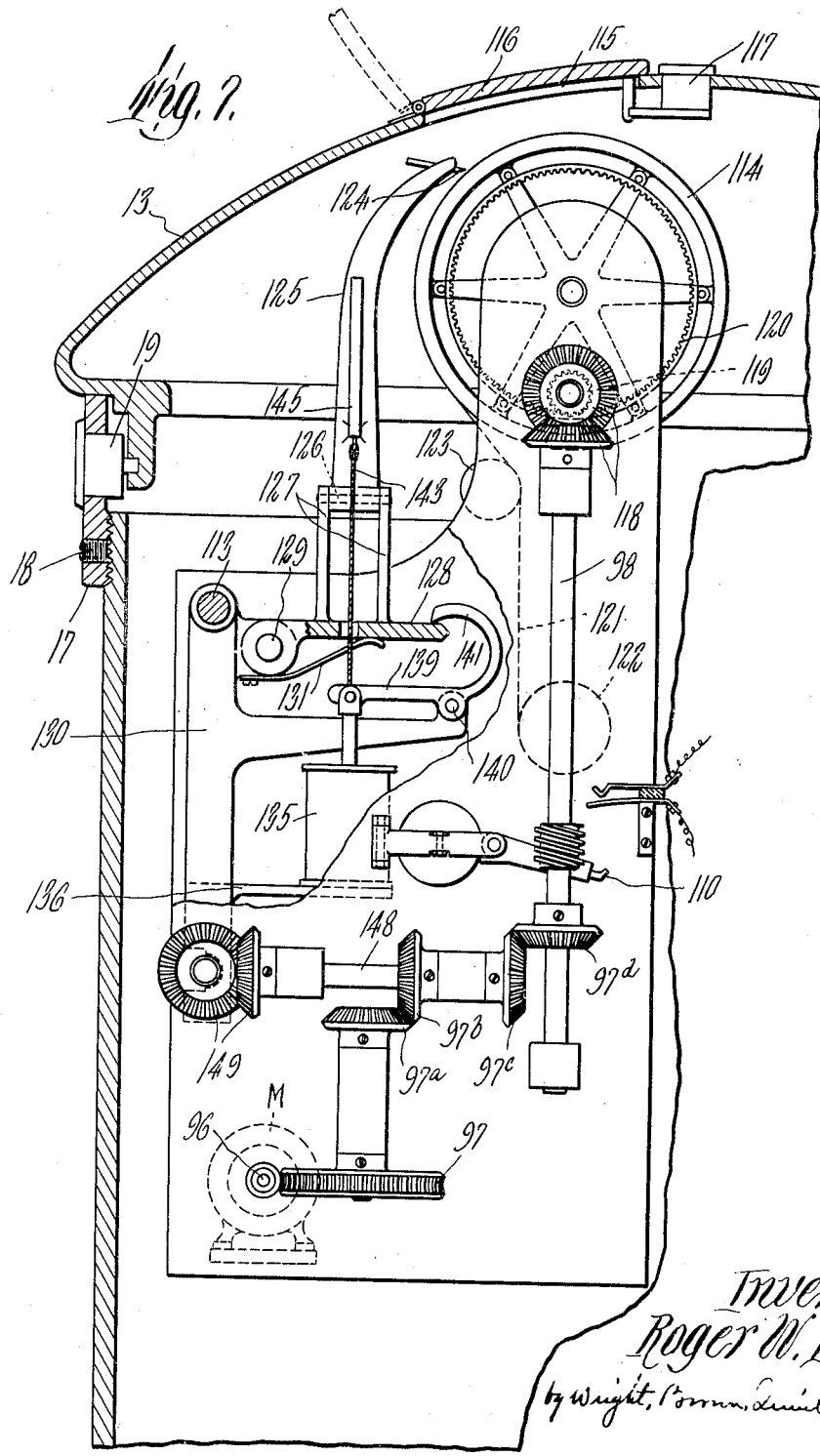

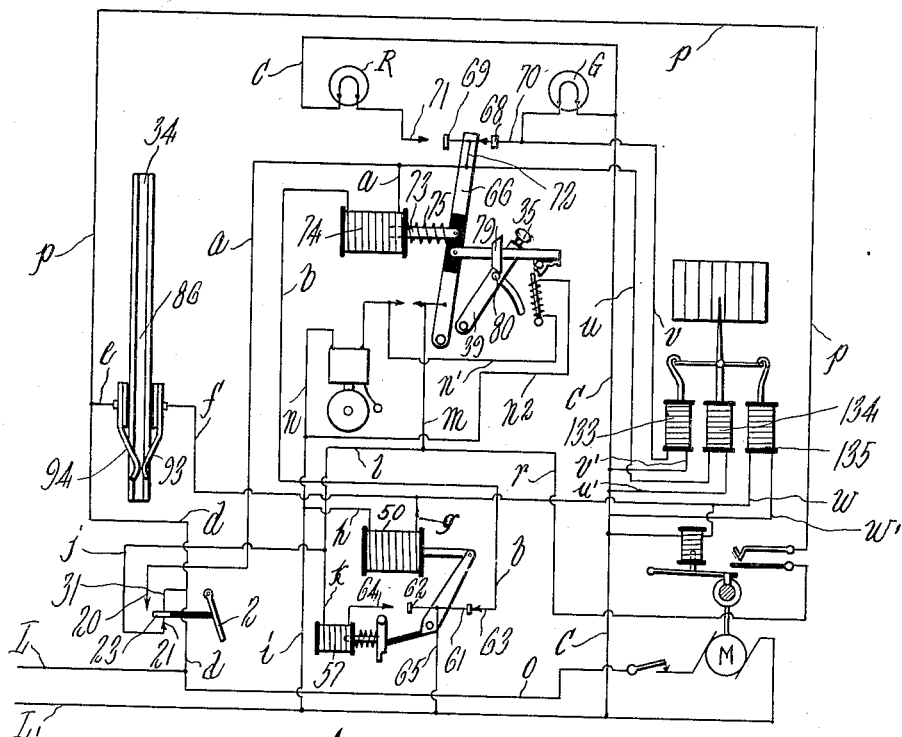

Aug. 3, 1937.   R. W. BABSON   2,088,683
PARKING REGISTER
Original Filed Feb. 13, 1932   5 Sheets-Sheet 5

Inventor
Roger W. Babson
by Wright, Brown, Quinby & May
Attys.

Patented Aug. 3, 1937

2,088,683

UNITED STATES PATENT OFFICE 2,088,683

PARKING REGISTER

Roger W. Babson, Wellesley, Mass.

Original application February 13, 1932, Serial No. 592,699. Patent No. 2,028,037, dated January 14, 1936. Divided and this application May 12, 1933, Serial No. 670,665. Renewed July 18, 1935

14 Claims. (Cl. 194—6)

The present invention is concerned with recording means and apparatus. The embodiment herein illustrated is associated with means operated by a parked automobile to make a record of the act of parking and the time thereof, the time of departure from the parking place, the time of making a payment for the privilege of parking; and/or other information for related purposes, or other purposes. The said embodiment of the invention is a division of my parent application entitled Parking register, filed February 13, 1932, Serial No. 592,699, on which Letters Patent No. 2,028,037 were granted January 14, 1936. However, I claim herein the benefit of all novel principles and characteristics of the apparatus, and parts thereof, shown herein, for all purposes to which they may be put.

In the drawings,—

Fig. 4 is an elevation of the recording apparatus which is contained within the casing shown in Fig. 1;

Fig. 5 is a detail sectional view taken on line 5—5 of Fig. 4;

Fig. 6 is a fragmentary perspective view of the screw and half nut by which the recording means and its controllers are moved transversely of the record sheet;

Fig. 7 is a fragmentary section of the casing taken on line 7—7 of Fig. 2, showing the recording mechanism in elevation as seen from the right of Fig. 4;

Fig. 8 is a fragment of a record made by the use of this recording mechanism;

Fig. 9 is a diagram of the electrical and mechanical parts of the recording mechanism, showing their interrelationship;

Like reference characters designate the same parts wherever they occur in all the figures.

Figure 1:
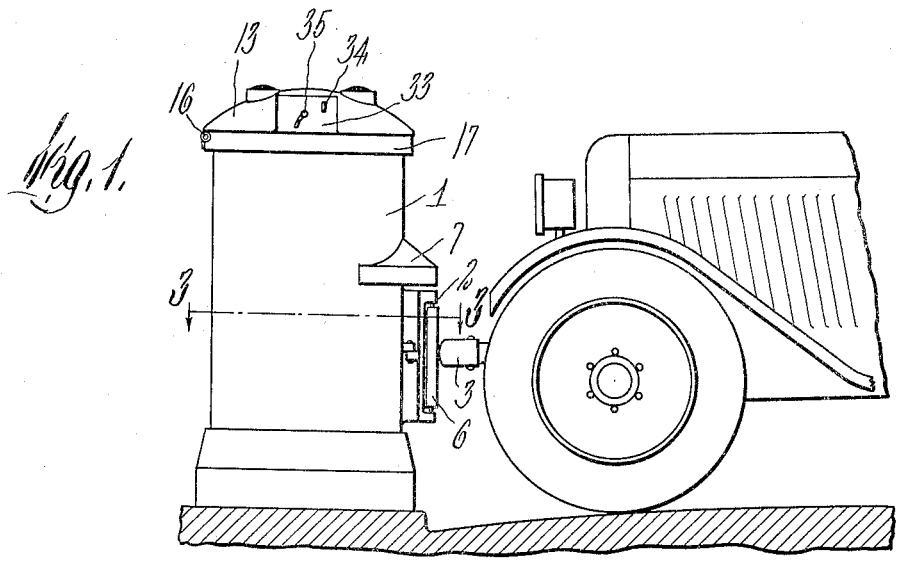
Fig. 1 is a side elevation of an embodiment of the invention, showing the forward end of an automobile parked adjacent thereto.
Figure 2:
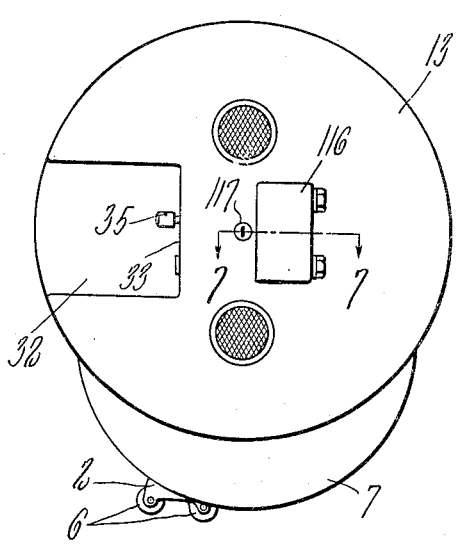
Fig. 2 is a plan view on a somewhat larger scale than Fig. 2 of the casing shown in Fig. 1.

In the present embodiment of the invention for use in recording the incidents of parking, and payment for parking time, of an automobile, the apparatus is contained in a casing 1, which may have the form of a post, erected on the sidewalk adjacent to a space in which parking of cars diagonal or square to the curb is permitted; or it may be set up elsewhere adjacent to a parking space. An actuator 2 is pivoted to the side of the casing at a height such that it may be pressed upon and moved by the bumper 3, either the front or rear bumper, of a parked automobile. In this illustration the actuator has the form of a door or shutter connected by hinges 5 to the body of the post and extending across an adjacent opening. It is equipped with rollers 6 in suitable positions to avoid rubbing or scraping, and marring, of the automobile bumper, and also to avoid wear on the actuator itself. A massive ledge 7 is formed on the side of the post above the actuator as a guard to prevent operation of, or injury to, the actuator by vehicles traveling close to the curb. It will be understood, however, that the details just described are illustrative merely and not limiting of the invention here claimed.

The top of the casing is formed by a cover 13, which may be adjusted rotatably, and also raised to give access to the interior. It is hinged at 16 to a ring 17, which is threaded on the upper end of the post and provided with a set screw for locking it in any position. A lock 19 (Fig. 7) prevents opening of the cover by any one except an authorized person who holds the key to the lock.

Figure 3:
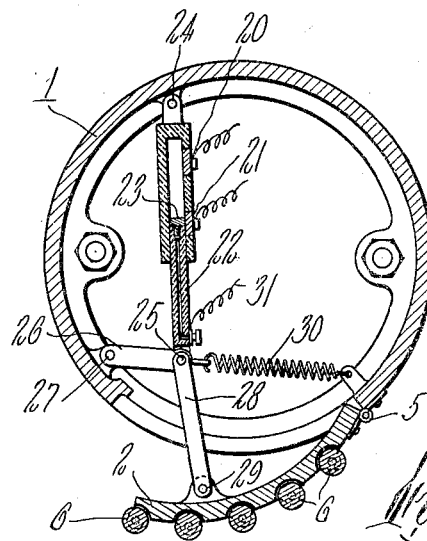
Fig. 3 is a horizontal section of the casing, and of the main switch therein, taken on line 3—3 of Fig. 1.

The actuator 2 controls the recording mechanism. It may be considered as the main or primary controller. Where, as in this instance, the control is effected electrically, this actuator operates an electric switch. A convenient switch for the purpose is shown in Fig. 3, consisting of a guide of insulating material having separated contacts 20 and 21, and telescopic slide 22, also of insulating material, carrying a complemental contact 23. The guide is pivoted at 24 to the body of the post and the slide is connected by a pivot 25 with a guide link 26, pivoted at 27 to the post, and with a connecting link 28 pivoted at 29 to the actuator. A spring 30 connected at opposite ends to the link 26 and to the post, normally holds the parts in the position shown in Fig. 3, where contact 23 is in engagement with contact 21. Movement of the actuator caused by a parked automobile shifts the contact 23 into engagement with the other complemental contact 20. Current for operating the mechanism is brought from a suitable source (such as the electric service supply of the community) to the contact 23 by a conductor 31 which is electrically connected thereto through a connection suitably insulated from contact 21. That is, the arrangement is such that the movable contact 23 may be brought exclusively into engagement with either of the complemental contacts.

Said cover 13 is recessed in one side at 32, and the inner side of the recess is formed by an upright wall 33 in which there is a coin slot 34, and from which protrudes a knob or handle 35. The slot enters a chute by which an inserted coin is conducted to operate, or form part of, a circuit closer, and from which the coin passes to a depository when released from its circuit closing position. The knob is carried by a lever, and is movably downwardly from the position shown in Fig. 1, with operation of such lever to release a coin from the circuit closing position above referred to, and perform other functions, fully explained in my herein noted parent patent, but unnecessary to the operation of the invention herein claimed.

The recording mechanism herein shown is organized to make a record of the operations performed in parking the car, or a succession of cars, throughout an entire week. It comprises a frame consisting of plates 111, 112, and connecting rods 113, which is mounted in any suitable manner and in any suitable location within the casing 1. A driver M, which is preferably an electric motor of the self-starting, synchronous running, type, is mounted on this frame, although it may be mounted elsewhere in the casing if desired. It drives a record carrying drum 114, which is mounted on one of the cross rods 113 of the frame, through a train of gearing and shafting consisting of the worm and wheel couple 96, 97, bevel gear train 97a, 97b, 97c, and 97d, shaft 98, bevel gear pair 118, pinion 119, and internal gear 120 secured to the drum.

The location of this drum is such that its upper side is near the cover 13 and is accessible through an opening 115 in the cover, which is normally closed by a door or shutter 116 controlled by a lock or latch 117. Such lock may be controlled by a special key, or automatically by the means later described in connection with Figs. 10 and 13. The object of this opening is to enable the operator of a parked car to inscribe the registration number of the car, or his name, or any other identifying insignia, on the record sheet or chart. Such record sheet is shown at 121 as being a tape or band taken from a supply roll or case 122 and wrapped about drum 114.

A marker 124 is carried on the extremity of an arm 125 which is connected by a pivot 126 between uprights 127 on a rocking holder, herein designed in the form of a plate 128, which is coupled by lugs and pivots 129 with a carriage 130. The axis of pivots 129 is parallel to the drum, whereby the marker may be brought against the record sheet and withdrawn, and pivot 126 is transverse to the drum to permit movement of the marker back and forth longitudinally thereof, i. e., parallel to the face of the record chart supported by the drum and transversely of the direction in which the chart is propelled. Springs 131 tend to raise plate 128, withdrawing the marker, and springs 132 tend to hold marker arm 125 central with respect to the support 127. Three solenoids 133, 134 and 135 are supported by a bracket or ledge 136 on the carriage. The cores of these solenoids extend from their upper ends and are connected respectively with levers 137, 138 and 139, all of which are pivoted on a common rod 140 on the carriage, and each of which has a curved arm 141 extending upward and back over the edge of plate 128. Thus when any of the solenoids is rendered active the marker is brought into engagement with the record sheet. The cores of the outer solenoids 133 and 135 are connected by cords or links 142 and 143 respectively with lateral projections or arms 144 and 145 on the marker arm 125; wherefore actuation of solenoid 133 moves the marker to the left, and of 135 moves it to the right (with respect to Fig. 4) as well as against the record sheet. In this illustration the connecting members 142 and 143 are flexible cords attached to the pivot pins which connect the solenoid cores with their respective levers 137 and 139.

The particular record sheet or chart shown in Figs. 4 and 8 is designed to exhibit the record marking with its parts relating to different days in different parts of the width of the sheet. To that end the paper is ruled in parallel columns of equal width, each appropriated to one of a number of successive days, and the marker is shifted sidewise continuously by the width of a column each twenty-four hours. Carriage 130 is adapted to slide sidewise on one of the cross rods 113 and carries on its lower end a half nut 146 (Fig. 6) adapted to engage the threads of a screw 147 mounted in the frame plates 111 and 112 parallel to the guide rod 113. In the construction shown, gravity alone furnishes all the force necessary to maintain engagement of the nut with the screw, permitting it to be readily disengaged when the carriage needs to be reset at the beginning point of its travel. The screw is rotated from the motor M through the gearing 96, 97, 97a and 97b previously described, a shaft 148 on which 97b is secured, and a bevel gear pair 149, one member of which is on shaft 148 and the other on the screw. The speed of rotation of the screw and the lead of its thread are designed with the proper values to shift the carriage across the entire width of the record sheet in the number of days covered by the record. The sheet is divided by horizontal lines into spaces of hours, or fractions of hours, each time space having a length equal to the distance traveled by the sheet in that length of time.

With the arrangement just described, if the marker were held constantly against the drum, it would draw a straight diagonal line from the upper left hand corner of the chart to the lower right hand corner, crossing the divisions between the adjacent columns at successive twenty-four hour intervals; making the records for successive days in tandem. However, it is within my contemplation to wrap the paper around the drum and secure it. In that case, the drum having a circumference equal to the length of the chart, and rotating once in twenty-four hours, the records for successive days would be made beside one another in the parallel columns. And with no other changes than of dimensions, speed of rotation of the drum, and rate of traverse of the marker carriage, records for successive twelve hour periods, or periods of any other prescribed length of time, may likewise be made beside one another in parallel columns. That is, separate columns may be made for the forenoon and afternoon records of each day.

The motor which governs the timing and recording phases of the invention may obviously be run either continuously or with interruptions for periods when parking is not permitted. For instance, if parking on a certain street, or on one side of a street, is permitted during part of a day and prohibited at times when the traffic is heavy, the motors of the machines at such places might be stopped under automatic or manual control, or disconnected from the driven mechanism, either automatically or manually, during the prohibited periods; and restarted or reconnected at the end of such periods.

The operation of the invention just described will now be explained with reference to the diagram shown in Fig. 9. When an automobile is brought into the correct position in the parking berth, it moves the actuator 2 and shifts the main switch contact 23 from the contact 21, with which it is normally engaged, to the contact 20. Current then flows from the positive side L of the supply circuit through the connecting conductor 31, contact 20, and conductor $a$ to a solenoid 74, and thence by conductor $b$, contacts 63 and 61, and conductor 65 to the negative side L' of the line or to ground. Solenoid 74, being thus made active, by means of its core 73 shifts a switch lever 66 from the position shown in Fig. 9, where a contact 68 carried by said lever engages a stationary contact 70, to the position in which another contact 69 carried by the lever engages a fixed contact 71; and the lever is locked in the latter position by a latch element 79, connected therewith, which then passes over and becomes interlocked with a stud 80 carried by a lever 39, to which the knob 35 is secured. In order to make the required payment for parking, the car operator places a coin or ticket of prescribed value in the slot 34. The coin falls through chute 86 and bridges across the gap between contacts 93 and 94, closing a circuit from line L through conductors $d$, $e$, $f$, $g$, solenoid 50, and conductors $h$ and $i$ to the return side of the circuit. The operator then grasps the knob 35 and moves it downward, thus releasing latch 79 and allowing lever 66 to be returned to first position by spring 75. At the same time lever 39 releases the coin from its circuit closing position between contacts 93 and 94, and allows it to fall into a depository.

Solenoid 134 is connected by conductors $a$ and $u$ with the main switch contact 20, and by conductors $u'$ and $c$ with ground or the return line of the circuit; solenoid 133 is connected by conductor $v$ with switch contact 70, which controls signal G, and by conductor $v'$ with the return line; and solenoid 135 is connected by conductors $f$ and $w$ with the coin controlled switch contact 93 and by conductor $w'$ with the return side of the circuit. Thus when the main switch is closed by the automobile in the parking berth, a mark such as those shown at $x'$ and $x^2$, is made on the record chart which is continued lengthwise of the latter until a coin is placed in the slot. This causes solenoid 135 to be operated and the marker to be shifted to the right, making a mark such as those shown at $y'$ and $y^2$. When the car operator thereafter pulls down the handle 35, solenoid 133 is energized by closing the switch 68, 70 and solenoid 135 is deenergized by passing of the coin out of the chute; whereupon the marker is moved to the left and makes a mark such as $z'$ or $z^2$. Thereafter, as long as the car remains in the parking space, and until the parking time paid for has expired,
the marker traces a line as $a'$ or $a^2$, longitudinally of the chart with an inclination toward the right. When the car leaves the berth, all the solenoid circuits are broken and the marker is withdrawn from the chart. The inscriptions placed on the record by car operators appear above the markings thus automatically made, as shown by the registration numbers 10, 100 and 20, 100 illustrated in Fig. 8.

Subsequent payments while the car remains in the berth are recorded by offsets similar to $y'$ and $z'$ made without a break otherwise in the continuity of lines such as $a'$ and $x'$, but an open space between such lines shows that the berth has remained unoccupied for a time corresponding to the length of the interruption. If the driver fails to make payment this fact is shown by the record as well as by the visible signal; while if he deposits the coin but omits to pull down the handle, this fact is shown on the record by a longitudinal line extending from the right hand end of a transverse mark such as $y'$, and shows that, notwithstanding the indication of the visible signal, the driver was not delinquent.

Figures 10, 11:
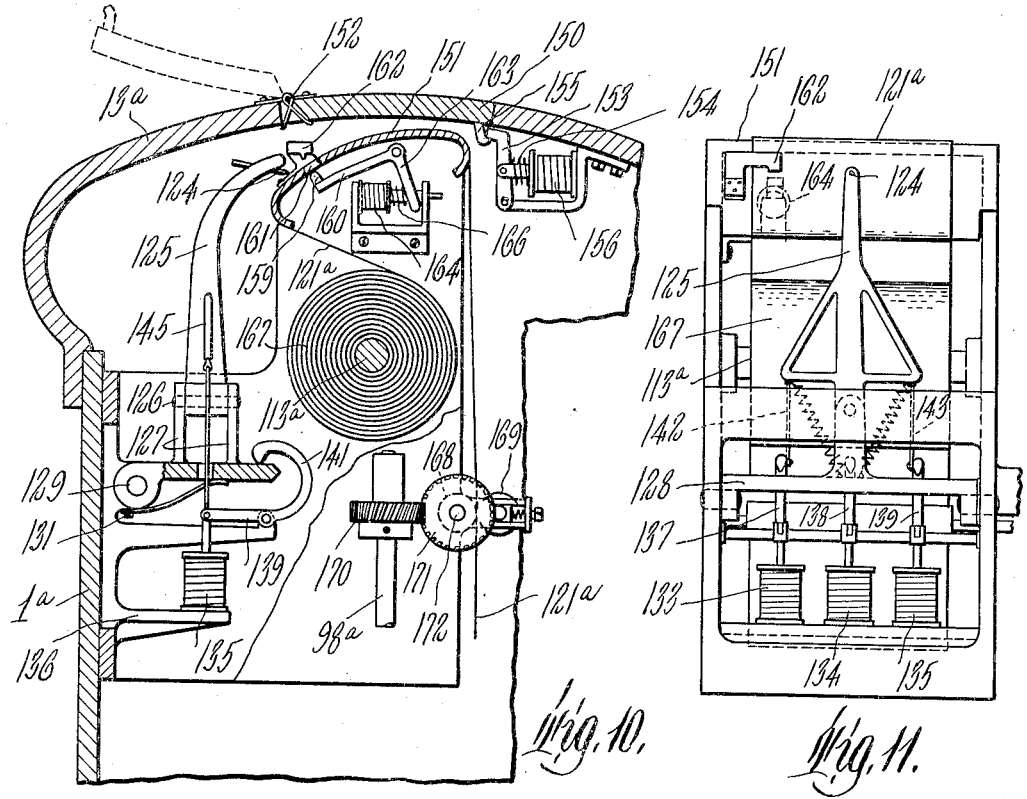
Fig. 10 is a view similar to Fig. 7 showing a variant of the recording apparatus.
Fig. 11 is an elevation of the recording means shown in Fig. 10.
Figures 12, 13:
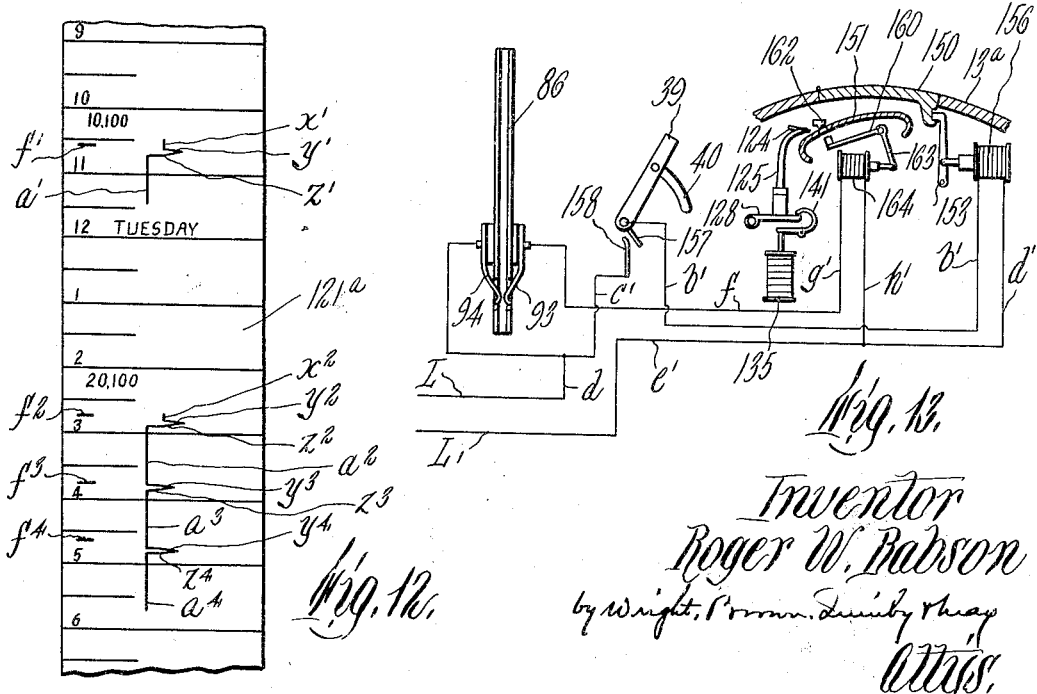
Fig. 12 is a fragment of a record produced by this last mentioned means.
Fig. 13 is an electrical diagram of the controls for the additional elements illustrated in Figs. 10 and 11.

Figs. 10-12 show a modification of the recording means in which the laterally movable marker carriage is omitted, the marker is held in a fixed location on the supporting frame, and the record chart is a long tape whereon the records for the several days follow one another in the same column. In this connection there is also illustrated automatic means set into action by or in consequence of the deposit of a coin, for enabling the operator to write his registration number and/or name, or any other appropriate information, on the record. This is the automatic means previously referred to, which may be applied equally well to the latching means for the door 116 shown in Fig. 11. The specific information given by the present illustration is that the driver of car number 10,100 parked just after 10:30 Monday night, paid the required fee, and left within the hour; and that the driver of car 20,100 entered the same berth at 3 a. m. Wednesday, paid fees then, and at the end of each of the following two hours, and left before the end of the third hour.

A door 150 is provided in the top of the post directly above the table 151 on which the record tape is supported. It is fitted with a spring 152 tending to throw it open, and is normally locked by a latch 153 which is projected by a spring 154 into the notch of a lug 155 on the door and is coupled with the core of a solenoid 156 so as to be released when the solenoid is energized. The solenoid winding is connected, as shown in Fig. 13, by conductor $b'$ with a switch contact 157 carried by the manually operated lever 39, the complemental contact 158 of which is connected with the positive side of the current source through the conductor $d$ previously described and a conductor $c'$. The terminal of the solenoid is connected by conductors $d'$ and $e'$ with the negative side of the curcuit. Thus when the operator pulls down the handle of lever 39 the door is released and flies open, and the record is exposed for inscription on it of the operator's registration number or name, or both.

The additional distinctive marks made when a coin is deposited are shown at $f'$, $f^2$, $f^3$ and $f^4$ in Fig. 10. They are made by a striker 159 carried by a lever 160 beneath the table 151, in a location beside the marker 124 and adapted to pass through a hole 161 and lift the paper against a narrow slit orifice of a nozzle protruding from the bottom of an ink fount 162 which is secured to the table near one end (Fig. 11) and overhangs the edge of the record tape. An arm 163 is coupled by a pin and slot connection with the core of a solenoid 164 and the striker is normally withdrawn from the paper by the joint action of gravity and a spring 166 confined between the solenoid spool and arm 163. The terminals of the solenoid winding are connected by a conductor $g'$ with the conductor $f$ leading from the coin controlled switch, and by conductors $h'$ and $e'$ with the return side of the circuit. Thus when the coin is deposited, the striker is displaced to press the paper against the nozzle of the ink fount, from which the paper is normally separated. It will be understood that the nozzle orifice is so narrow as to prevent dripping of ink on the paper. This form of marking means may be replaced by equivalent means of specifically different character. It is preferably located beside the marker 124 on the same line perpendicular to the length of the record sheet, as indicated by the marks shown in Fig. 12, although in Fig. 10 it is represented, for clearness of illustration, as displaced along the tape. However, it may be placed anywhere and its indications read with due allowance for its known distance of displacement from the other markings on the sheet.

Fig. 10 shows also an alternative means for driving the record tape occasioned by the fact that it may be of great length and that its support is a stationary table. It is provided on a supply spool 167 mounted on a cross rod 113a of the marker supporting frame, and is driven by a pair of rolls 168 and 169 between which it passes. Roll 169 is spring pressed toward the other and against the tape, while roll 168 is positively driven by helical gears 170 and 171, the former being on a shaft 98a, corresponding to shaft 98 of the preceding description, and the other being on shaft 172 of the roll. In all other respects the recording means and the parts thereof are like the means previously described and are designated by the same reference characters, except only that the record tape, being specifically different from the chart 121, is designated as 121a. The diagram Fig. 13 is intended to show additions to, not substitutions for, the elements shown in Fig. 9. It is to be understood that these additions are used in conjunction with the signal- and record-controlling devices shown in Fig. 9 and previously described.

What I claim and desire to secure by Letters Patent is:

1. A parking register comprising a main actuator movable by a car placed in parking position, a coin receiver, means for supporting and propelling a record chart, a marker for inscribing on said chart normally removed therefrom, means for bringing the marker into contact with the chart when the main actuator is so moved, and means controlled by a coin deposited in said receiver for imparting a distinctive scribing movement to the marker.

2. A parking register comprising a hollow post having a cover, means in the post for supporting and propelling a record chart with a portion thereof near the cover, a door in the cover over said portion of the chart adapted to be opened to permit access of a person to the chart for writing thereon, an automatic marker for inscribing the chart, and coin controlled means in the post, operable by a coin therein for causing said marker to inscribe the chart.

3. A parking register comprising an electric switch closable by a parked automobile, a record chart, motor driven means for propelling said chart, a marker normally displaced from the chart, means operable by closing of said switch for bringing the marker against the chart, a coin receiver, and means operated by a coin in said receiver for shifting the marker across the chart.

4. A parking register comprising an enclosed casing related to a parking berth, a record chart and means for propelling the same located in said casing, a marker in the casing normally displaced from the chart, means operated by an automobile placed in such berth for bringing the marker against the chart, a coin receiver in the casing, means actuated by a coin therein to shift the marker over the chart in one direction transverse to the direction of propelled travel of the chart, a manually movable member, and means operable by said member for shifting the marker in the opposite direction to that in which it is shifted by deposit of a coin.

5. A recording apparatus comprising a record chart, means for propelling said chart, a marker, means for supporting the marker movably so that it may move toward and away from the surface of the chart and also shift parallel with the face, and laterally across the path of movement, of the chart, constantly acting yieldable means tending to place and hold said supporting means with the marker in a normal position displaced from the chart, and a plurality of operating devices, each actuable independently of the other and operative to shift the marker into contact with the chart, and one of them being organized to displace the marker laterally at the same time.

6. A recording apparatus comprising a record chart, means for propelling said chart continuously during an extended time period, a marker mounted adjacent to said chart with capacity for movement into and out of contact with the surface thereof and being adapted to inscribe a line on such surface when held in contact therewith and the chart is propelled at the same time, the marker being normally withdrawn from said surface and also being movable transversely of the travel of the chart, a plurality of electromagnets coupled with the marker for pressing it against the chart and one of them organized to move the marker transversely as well, and switches separately connected in the circuits of the different electromagnets.

7. In a recording mechanism, a record chart, means for propelling said chart, guiding means arranged to cause movement of the chart in a given path, a stationary marker adjacent to said guiding means and near to, but displaced from the normal path of the chart, a striker operable to shift the chart from its normal path into contact with said marker, electromagnetic means for so actuating said striker, a coin receiver, and means operated by a coin in said receiver for causing said electromagnetic means to actuate the striker.

8. A recording apparatus comprising means for supporting and propelling a record chart, a marker, a holder for said marker movable to shift the latter toward and away from the chart and with which the marker is connected in a manner permitting it to move laterally of the movements toward and away from the chart, yielding means acting on said holder and marker normally holding the marker away from the chart and in a mid-position with respect to its scope of lateral movements, and a plurality of separate actuating devices, one of which is operable to move said holder so as to bring the marker against the chart, and the others respectively to move the marker to right or left of said central position in marking contact with the chart.

9. A recording apparatus comprising means for supporting and propelling a record chart, a marker, a holder for said marker movable to carry the marker toward and away from the chart, an arm pivoted to said holder on an axis extending in the general direction of said movements, on which arm the marker is mounted, yielding means acting on the holder and on the arm respectively so as to displace the marker from the chart and hold it in a given position with respect to its scope of movement about the pivot axis, three levers engaged with said holder and each adapted to shift the holder into a position for effecting contact between the marker and chart, and connections between two of said levers and the marker carrying arm whereby operation of one of such two levers shifts the arm to the right and operation of the other shifts the arm to the left.

10. A parking register comprising a main actuator movable by a car being placed in parking location, a coin receiver, a manual actuator, means for supporting and propelling a record chart, a marker cooperatively mounted with respect to said chart, a plurality of devices each operable by said main actuator, by a coin in said receiver, and by said manual actuator, respectively, and connections between each of said devices and the marker for causing the marker to make distinct markings on the chart.

11. A parking register comprising an electric switch closable by a parked automobile, a record chart, motor driven means for propelling said chart, a coin receiver, a marker normally displaced from the chart, electromagnetic means in circuit with said switch and connected with the marker to cause the latter to make a distinctive mark on the chart when the switch is closed, and means controlled by a coin in said receiver for effecting a mark-producing engagement between the marker and chart.

12. A parking register comprising a supporting structure, an electric switch in said structure, an external switch actuator located in such position that it can be engaged and moved to close said switch by an automobile placed adjacent to the supporting structure, a record chart within said supporting structure, motor driven means for propelling said chart, a marker in cooperative proximity to said chart, and electromagnetic means operable by closing of said switch and connected with said marker to cause the latter to make a distinctive marking on the chart.

13. A recording apparatus comprising a record chart, means for propelling said chart continuously during an extended time period, a marker mounted adjacent to said chart with capacity for movement toward and away from the surface thereof and also in directions parallel to such surface and transverse to the movement of the chart, such marker being adapted to inscribe a line on such surface when held in contact therewith and the chart is propelled at the same time, the marker being normally withdrawn from said surface, an actuator movable back and forth between two positions, means controlled by said actuator organized to exert force to the marker tending to place and hold it against the chart so long as said actuator is in one of said positions, and other actuating means organized to apply force to said marker to move it transversely of the chart while in contact therewith.

14. A recording apparatus comprising a record chart, means for propelling said chart continuously during an extended time period, a marker mounted adjacent to said chart with capacity for movement into and out of contact with the surface thereof and being adapted to inscribe a line on such surface when held in contact therewith and the chart is propelled at the same time, the marker being normally withdrawn from said surface and also being movable transversely of the travel of the chart, an actuator independent of the chart-propelling means for bringing and holding the marker in contact with the chart, and coin-controlled means for thus transversely moving the marker while in contact with the chart.

ROGER W. BABSON.